United States Patent
Nakagomi et al.

(10) Patent No.: US 6,556,552 B1
(45) Date of Patent: Apr. 29, 2003

(54) SIGNAL STRENGTH MEASUREMENT METHOD AND DEVICE

(75) Inventors: Hisashi Nakagomi, Kanagawa (JP); Tadao Takami, Kanagawa (JP); Akihiro Higashi, Kanagawa (JP); Kiyohito Nagata, Kanagawa (JP)

(73) Assignee: NTT Communications Networks, Inc., Tokyo (JP)

( * ) Notice: Subject to any disclaimer, the term of this patent is extended or adjusted under 35 U.S.C. 154(b) by 0 days.

(21) Appl. No.: 09/446,667

(22) PCT Filed: May 11, 1999

(86) PCT No.: PCT/JP99/02426

§ 371 (c)(1), (2), (4) Date: Dec. 21, 1999

(87) PCT Pub. No.: WO99/59268

PCT Pub. Date: Nov. 18, 1999

(30) Foreign Application Priority Data

May 13, 1998 (JP) .......................................... 10-130613

(51) Int. Cl.⁷ ................................................ H04Q 7/00
(52) U.S. Cl. ....................................... 370/332; 455/464
(58) Field of Search ................................ 370/311, 331, 370/332, 335, 342, 412; 455/403, 421, 422, 436, 437, 442, 450, 451, 464, 522

(56) References Cited

U.S. PATENT DOCUMENTS

| | | | | |
|---|---|---|---|---|
| 5,864,578 A | * | 1/1999 | Yuen .......................... | 375/200 |
| 5,920,549 A | * | 7/1999 | Bruckert et al. ............. | 370/331 |
| 6,078,570 A | * | 6/2000 | Czaja et al. ................ | 370/331 |
| 6,175,561 B1 | * | 1/2001 | Storm et al. ................ | 370/342 |
| 6,278,877 B1 | * | 8/2001 | Brederveld et al. ......... | 455/434 |
| 6,324,207 B1 | * | 11/2001 | Kanterakis et al. ......... | 375/141 |
| 6,359,867 B1 | * | 3/2002 | Ali-Vehmas ................ | 370/331 |

FOREIGN PATENT DOCUMENTS

| | | |
|---|---|---|
| JP | 1-321739 A | 12/1989 |
| JP | 8-149551 A | 6/1996 |

* cited by examiner

Primary Examiner—Daniel Hunter
Assistant Examiner—James Ewart
(74) Attorney, Agent, or Firm—Brinks Hofer Gilson & Lione (57) ABSTRACT

In CDMA mobile communication systems, there are cases in which communications are interrupted with the local base station while the mobile station is searching for channels other than the communication channel. A method is offered of preventing loss of information due to interruptions in such a case. There are a first transmission step for transmitting signals from the mobile station to the base station at a transmission rate R1 and a transmission output level P1 (when the transmission output is p in FIG. 10C), a suspension step of suspending signal transmissions from the mobile station to the base station (when no transmission output power as shown in the same drawing), and a second transmission step of transmitting signals from the mobile station to the base station at a transmission rate R2 higher than the transmission rate R1 and a transmission output level P2 higher than the transmission output level P1 (when 2p in the same drawing). Due to this second transmission step, it is possible to transmit information which was not transmitted during the suspension period.

8 Claims, 10 Drawing Sheets

FIG. 10A FRAME STRUCTURE

FIG. 10B CASE OF CONTINUOUS TRANSMISSION

FIG. 10C NON-CONTINUOUS TRANSMISSION METHOD 1

FIG. 10D NON-CONTINUOUS TRANSMISSION METHOD 2

FIG. 10E NON-CONTINUOUS TRANSMISSION METHOD 3

SIGNAL STRENGTH MEASUREMENT METHOD AND DEVICE

TECHNICAL FIELD

The present invention relates to a communication method which is suitable for mobile communication systems, and specifically relates to a method suitable for use in measuring signal quality and controlling mobile stations in mobile communications wherein multiple-access connections between mobile stations and fixed stations are performed by a CDMA method.

BACKGROUND ART

Mobile communications have become widespread, and TDMA (time-division multiple access) is often employed as a multiple access method, but in recent years, the trend has been toward employment of CDMA (code-division multiple access) which has advantages such as making efficient use of frequencies, being able to readily handle communications at different transmission rates, and being difficult to intercept.

When a mobile station such as a cellular phone is on standby or is in communication on a radio channel set up by a certain base station, the signal quality on that radio channel will change when the mobile station moves.

Therefore, in order to attain radio channels with better quality, a mobile station performs as follows. Firstly, the mobile station receives radio channels that are transmitted from the neighboring base stations and also other radio channels that are transmitted from the base station which has already established a radio link with the mobile station, and measures the signal quality of those radio channels. Secondly, the mobile station compares the quality of those radio channels with that of the radio channel being used for standby or connection. Thirdly, the mobile station controls switching to a radio channel found to have high quality as a result of the comparison.

Here, with TDMA, multiple access connections are made by dividing the time of use of the same radio frequency among each user. That is, the radio channels are formed by dividing the time of use of a single radio frequency into a plurality of time slots, each user using a different time slot. In a mobile communication system employing TDMA in this way, time slots, which are not used by users, are specially provided aside from the time slots used for transmission and reception. During those idle slots, the signal quality of radio channels that are aside from the radio channel that has already been used to establish a radio link are measured. Then a comparison is made with the quality of the radio channel which was used for standby or communication, and the radio channel is switched to the one with the highest quality.

On the other hand, CDMA is realized by using different codes for each user on the same radio frequency. For this reason, the time of use on the same frequency is not divided for the sole purpose of achieving multiple access connections. There are no slots or frames reserved especially for measuring the quality of the radio channels.

Figure 6:
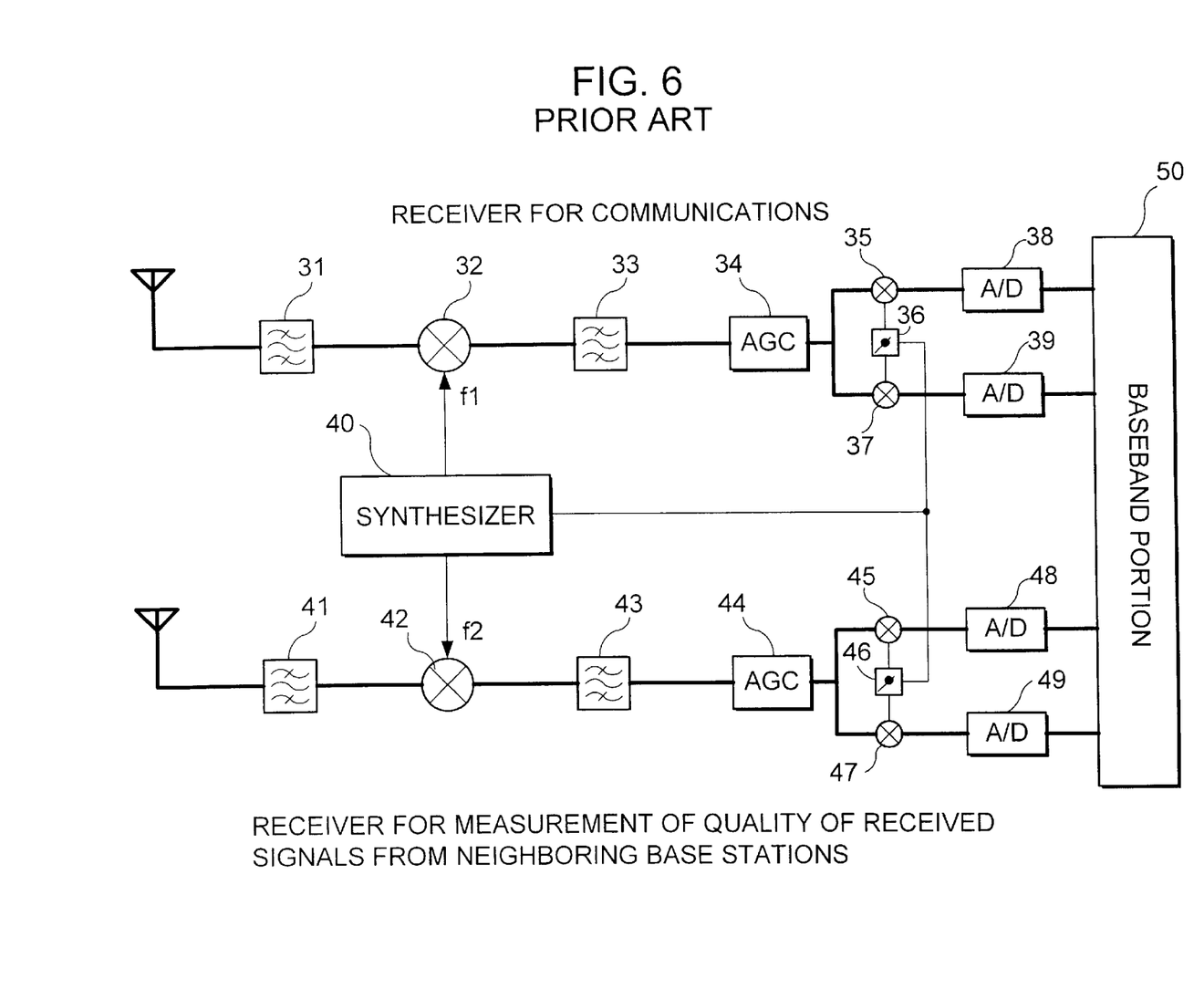
FIG. 6 is a block diagram showing the configuration of an essential portion of a conventional receiver.

Therefore, in mobile communication systems employing CDMA technique, in order to receive radio channels that are apart from the radio channel that has been used to establish a radio link and measure the quality thereof, it is necessary to have two receivers, i.e. a receiver used for communications and a receiver for receiving other radio channels that are transmitted from the neighboring base stations as well as the same base station which has established a radio link with the mobile station, and measuring the quality thereof, as shown in FIG. 6.

Each receiver system in FIG. 6 principally comprises a frequency converter for converting a signal received in the antenna to a processing frequency band by mixing (multiplying) with a signal generated by a synthesizer 40, and two PSK detectors for QPSK (quadrature phase shift keying) detecting the down-converted signal. The signal received by the antenna is filtered by a filter 31, 41. The filtered signal is then mixed with the signal from the synthesizer 40 by the mixer 32, 42. The frequency of the signal from the synthesizer 40 (f1 or f2) to the mixer 32, 42 differs between the receiver system. In any case, the mixed signal is then supplied to another filter 33, 43 and the output from this filter 33, 43 is supplied to an automatic gain control (AGC) 34, 44. The signal supplied from the AGC 34, 44 is split. The split signals are then mixed at a pair of mixers 35, 37 and 45, 47. The split signals are mixed with a signal from the synthesizer 40 that has been divided into orthogonal phases by a phase splitter 36, 46. The output from each mixer in the pair of mixers 35, 37 and 45, 47 is then supplied to A/D converters 38, 39 and 48, 49 and the digitized output from the A/D converters, 38, 39 and 48, 49 supplied to the baseband portion 50. The carrier waves supplied from the synthesizer 40 to each PSK detector are mutually out of phase by $\pi/2$. Then, the baseband portion 50 performs communications with the base station by executing a designated procedure with respect to the signals received from the base station based on in-phase signals and orthogonal signals detected by the communication receiver, and measures the quality of the radio channel being used for communication. The baseband portion 50 also measures the quality of radio channels other than the radio channel currently being used to establish a radio link for receiving user information. The measurement is based on the demodulated in-phase and orthogonal signals received by a signal quality measuring receiver. Then, the baseband portion 50 compares the qualities of the radio channels measured above.

However, due to the demand for more compact and lightweight cellular phones, the structures such as to provide an additional receiver exclusively for quality measurements of radio channels in adjacent base stations goes against such demands. Additionally, it is important to reduce the power consumption because cellular phones basically use rechargeable batteries as power sources, structures which provide two receiver systems in the mobile stations also go against demands for lower power consumption.

On the other hand, a structure wherein the radio channel quality measurements and radio channel switching control is not performed on the mobile station side but on the base station side might also be considered. However, with this type of structure, each base station must separately provide a quality measurement receiver corresponding to each mobile station, and the processing load on the network side including the base station will increase, so that this would be an extremely unrealistic resolution for the present day situation in which many mobile stations can be expected to be used at the same time.

DISCLOSURE OF THE INVENTION

The present invention has been made in view of the above situation, and has a first objective of measuring the quality of nearby radio channels without providing an exclusive receiver on the mobile station side and ensuring compactness, lightness and reduced power consumption in mobile communications performing multiple access connections by means of a CDMA method.

Additionally, a second objective is to largely reduce the load on the base station side.

In order to achieve the above objectives, the invention is a communication method in a communication system having a first transmission device and a plurality of second transmission devices that are communicating with the first transmission device. The communication method being performed by each of the second transmission devices, comprises a step of intermittently receiving signals transmitted from the first transmission device or intermittently transmitting signals to the first transmission device.

A preferred embodiment is a communication method wherein the first transmission device and second transmission devices perform multiple access connections by means of a CDMA method. The first transmission device transmits control information for controlling the second transmission devices and user information to the second transmission devices using a radio channel divided into a plurality of slots. The communication method comprises a step of the second transmission devices detecting slots in which user information does not exist. Then using those slots period, which do not contain user information, the second transmission devices receive other radio channels that are transmitted from the first transmission device and also radio channels that are transmitted from the neighboring base stations. The second transmission devices will perform the measurement of the quality of the received signals. (refer to FIGS. 3A–3D)

According to this embodiment, it is possible to measure the quality of nearby radio channels without providing an exclusive receiver on the mobile station side and ensuring compactness, lightness and reduced power consumption in mobile communications performing multiple access connections by means of a CDMA method. Furthermore, since the communication quality is measured in the mobile station and the radio channel switching control for zone transfer and handover is performed under the supervision of the mobile stations, it is possible to largely decrease the load on the base station side.

Additionally, a further embodiment comprises an initial transmission step of transmitting signals from the second transmission device to the first transmission device at a transmission rate R1; a suspension step of suspending signal transmissions from the second transmission device to the first transmission device; and a second transmission step of transmitting signals from the second transmission device to the first transmission device at a transmission rate R2 higher than the transmission rate R1. (refer to FIGS. 10A–10E)

According to this embodiment, after the suspension step of suspending signal transmissions from the mobile station (second transmission device) to the base station (first transmission device) is performed, the second transmission step of transmitting signals from the mobile station to the base station at a high transmission rate R2 is performed, thereby preventing the loss of information when communications are interrupted for the reception of neighboring radio channels.

BEST MODES FOR CARRYING OUT THE INVENTION

First Embodiment

The embodiments of the present invention shall be explained with reference to the drawings.

Figure 1:
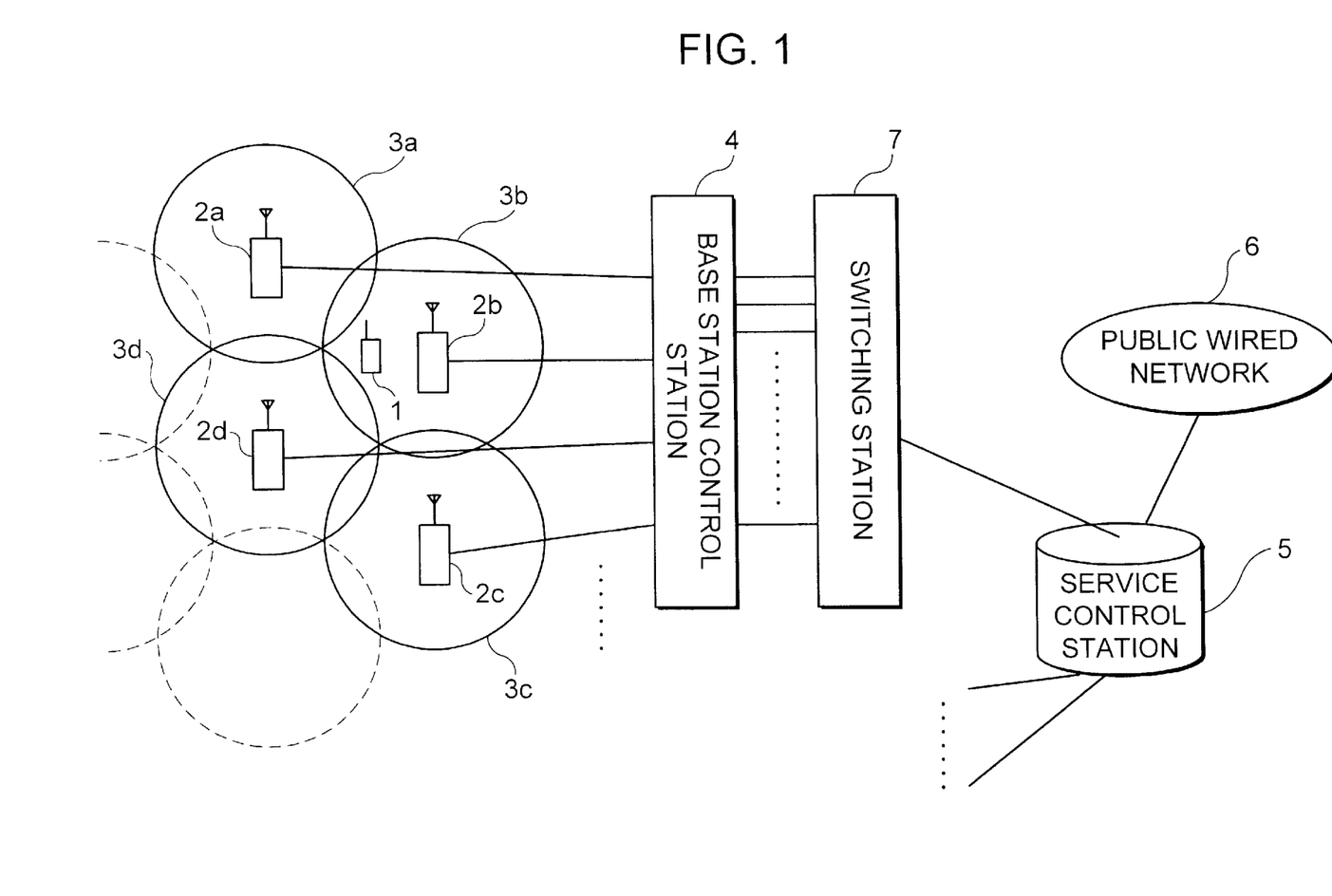
FIG. 1 is a block diagram showing the configuration of a mobile communication system according to a first embodiment of the present invention.

FIG. 1 is a block diagram showing the configuration of a mobile communication system according to an embodiment of the present invention. In this drawing, the mobile station 1 has the ability to establish radio communication according to a CDMA method with any one of the base stations 2a, . . . Each base station 2a, . . . manages communications in the radio zone 3a, . . . assigned thereto, and they are all controlled by a base station control station 4.

A service control station 5 is connected to a public wire network 6, and unites a plurality (although there is only one shown in the illustrated example) of switching stations 7.

If a call to a mobile station occurs while mobile station 1 lies in the radio zone 3b, the connection path from the service control station 5 to the base station 2b of the radio zone 3b in which mobile station 1 lies is set according to a conventional method in order to call mobile station 1.

Figure 2:
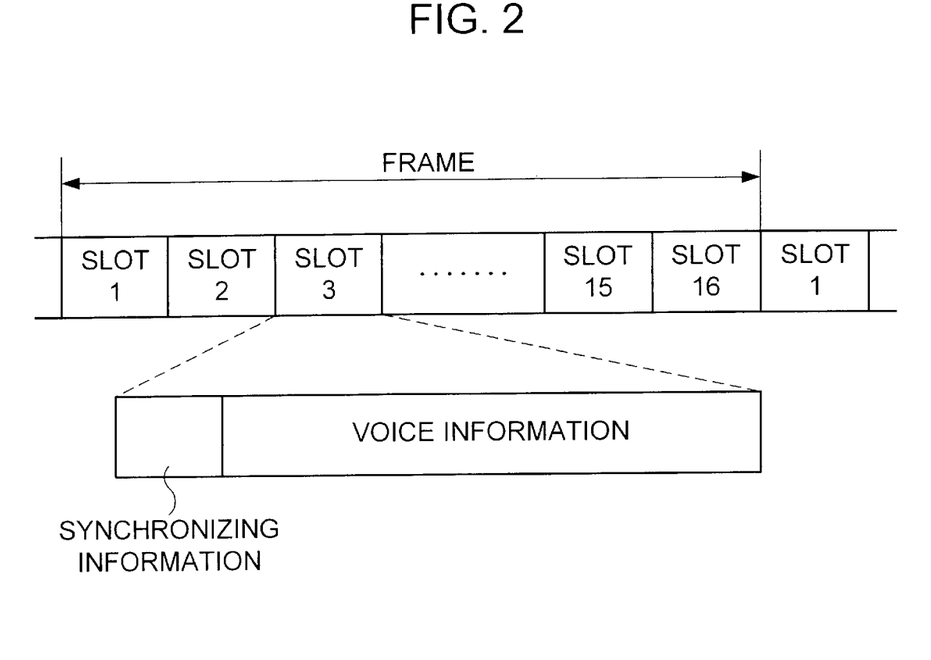
FIG. 2 is a diagram showing an example of a signal format on a radio channel of the same mobile communication system.

Here, with regard to the mobile communication system according to the present embodiment, an example of a radio channel format used when sending out signals from the base station to the mobile station shall be explained with reference to FIG. 2. As shown in this drawing, this radio channel has a repeating pattern wherein a single frame is divided into sixteen slots. Here, as indicated in the drawing, each slot is arranged so as to have synchronizing information at the head of the voice information. This synchronizing information is used so that the mobile station 1 will receive the voice information in synchronism with each slot.

The multiple access connections in the present embodiment are realized by a CDMA method using a different code for each user on the same radio frequency. For this reason, in the present embodiment, the radio channels are divided into a plurality of slots not for multiple access connection purposes, but in order to send control information such as synchronizing information to the mobile station 1 along with voice information using the same radio channel.

Next, the mobile station receiving operations in a mobile communication system according to the present embodiment shall be explained. Here, to simplify the explanation, a state wherein the mobile station 1 lies in the radio zone 3b and has already established a communication path with the base station 2b shall be assumed.

Figure 3A:
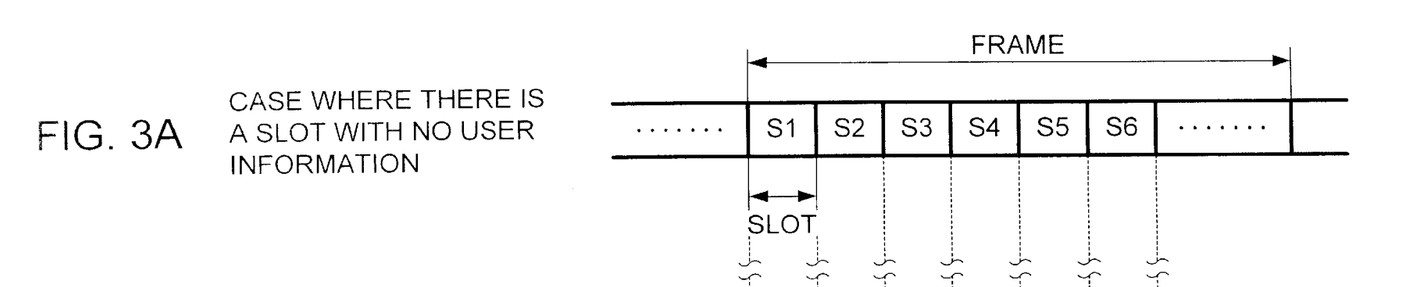
FIGS. 3A–3D are diagrams for respectively explaining the relationship between the state of the communication data on the same mobile communication system and the quality measurement operations for the received signals from nearby base stations.

If the radio channel from the base station 2b to the mobile station 1 is defined as indicated in FIG. 3A, then the mobile station 1 detects slots in which voice data do not exist, and during the periods of those slots, it receives radio channels of other base stations 2a, 2c and 2d which are adjacent to the base station 2b. The mobile station 1 also receives other radio channels that are transmitted from the base station 2b but the radio channels are apart from the one which was currently in connection with the base station 2b. Then, mobile station 1 measures the quality of the received signals and compares the signal qualities of the radio channels.

If as a result of the comparison the radio channel currently being used is found to have the best signal quality, then the communication path is maintained as is, whereas if the signal quality of a radio channel which is different from the radio channel currently being used is found to be the best, then control is performed to switch to that best radio channel.

Here, in the case of the latter, there are two possible cases. In one case, the switch is made to a radio channel of one of the base stations 2a, 2c or 2d which are adjacent to the base station 2b. In another case, the switch is made to another radio channel transmitted from the base station 2b.

Figure 3B:
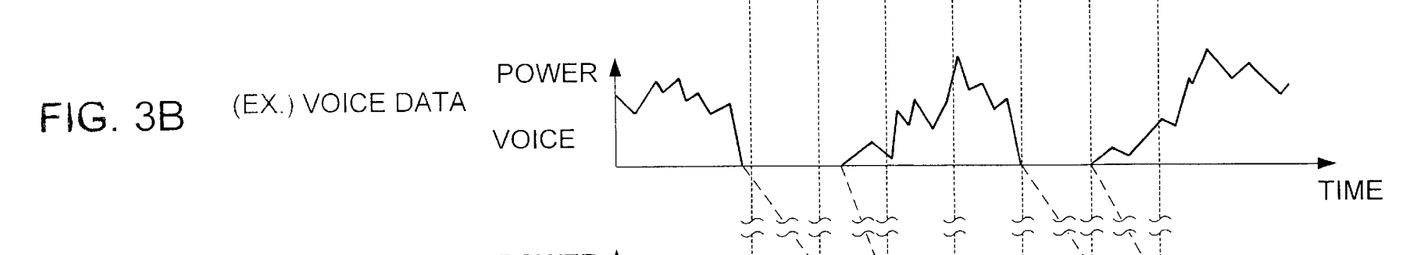
Figure 3C:
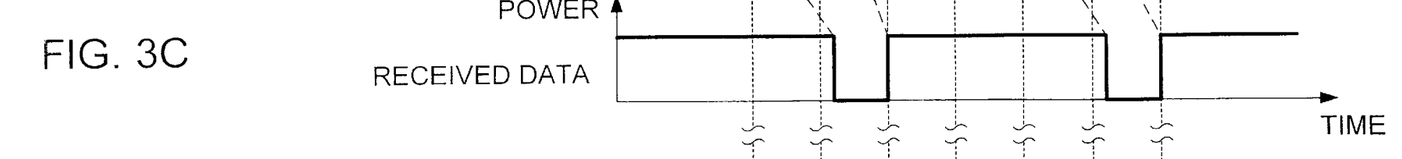
Figure 3D:
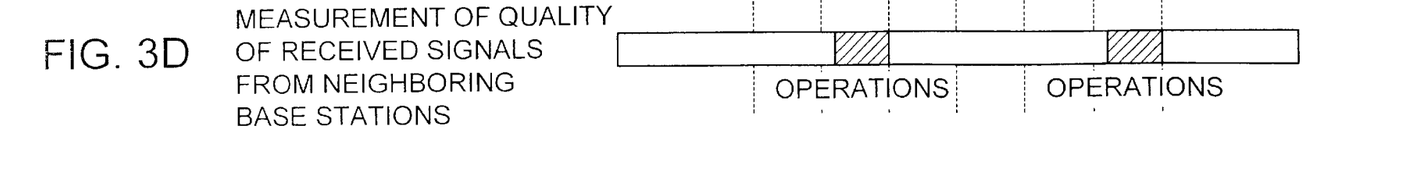

Due to the delay in the process of dividing the voice data into slots, the mobile station 1 only interrupts the reception of other radio channels with a certain time delay. For this reason, as shown in FIG. 3B, for example, if voice data does not exist in the periods of slots S1 and S5, then in actuality, the mobile station 1, as shown in FIG. 3C, interrupts the reception of radio channel signals from the base station 2b at the periods of slots S2 and S6 which come one slot later than the slots S1 and S5, and receive signals from different radio channels as indicated in FIG. 3D.

Additionally, for each slot, the mobile station 1 will only begin to receive signals of different radio channels during the periods of voice information in which voice data does not exist in each slot, because the mobile station 1 receives the synchronization information positioned at the head of each slot. In FIG. 3C, this is signified by the fact that the reception operations of the current radio channel from the base station 2b are executed from the head potions of the voice information of the slots S2 and S6 in the mobile station 1.

Further, it is of course possible to perform switching control not only of radio channels, which are communicating, but also those that are standing by.

According to a mobile communication system of this type, the mobile station 1 is implemented to detect slots in which voice data do not exist, receives signals of radio channels apart from the radio channel currently being used to establish the link, and measures the quality of those signals. There is no necessity to separately provide a quality measuring receiver with the communication receiver in the mobile device. Therefore, a single receiver system is sufficient as shown in FIG. 5.

Figure 5:
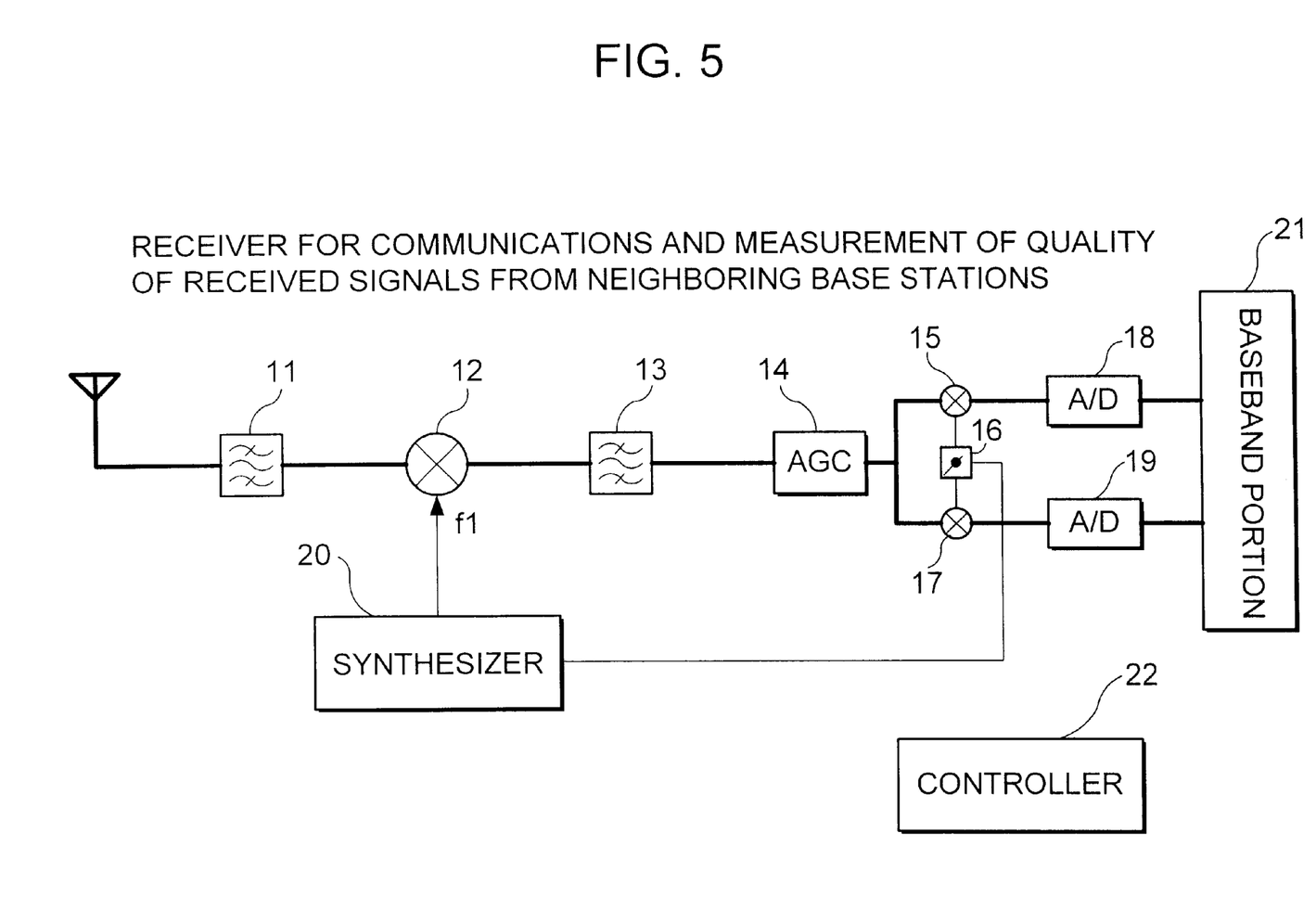
FIG. 5 is a block diagram showing the configuration of an essential portion of a receiver according to an embodiment of the present invention.

The single receiver system shown in FIG. 5 principally comprises a frequency converter for converting a signal received in the antenna to a processing frequency band by mixing (multiplying) with a signal generated by a synthesizer 20, and a PSK detector 16 for QPSK (quadrature phase shift keying) detecting the down-converted signal. The signal received by the antenna is filtered by a filter 11. The filtered signal is then mixed with the signal from the synthesizer 20 by the mixer 12. The mixed signal is then supplied to another filter 13 and the output from this filter 13 is supplied to an automatic gain control (AGC) 14. The signal supplied from the AGC 14 is split. The split signals are then mixed at a pair of mixers 15, 17. The split signals are mixed with a signal from the synthesizer 20 that has been divided into orthogonal phases by a phase splitter 16. The output from each mixer in the pair of mixers 15, 17 is then supplied to A/D converters 18, 19 and the digitized output from the A/D converters 18, 19 supplied to a baseband portion 21. The baseband portion 21 performs communications with the base station by executing a designated procedure with respect to the signals received from the base station based on the signals detected by the communication receiver, and measures the quality of the radio channel being used for communication. The baseband portion 21 also measures the quality of radio channels other than the radio channel currently being used to establish a radio link for receiving user information. Then, the baseband portion 21 compares the qualities of the radio channels measured above. As can be seen, the individual components of the single receiver system shown in FIG. 5 are similar to those in the conventional dual-receiver system shown in FIG. 6.

The controller 22 controls the communication path to provide the best radio channel. That is, the controller 22 controls whether the communication path is maintained as is or switches to another radio channel, the best radio channel. As above, the communication path may be switched to a radio channel of one of the base stations 2a, 2c or 2d which are adjacent to the base station 2b or to another radio channel transmitted from the base station 2b.

As a result of having the single receiver system, it is possible to make the mobile station more compact and more lightweight, as well as to ensure low power consumption. Additionally, since the radio channel switching control is performed under the supervision of the mobile station, the load on the base station side can be largely reduced.

Second Embodiment

Next, an embodiment which ensures compactness, lightness and low power consumption in the mobile station and performs switching control of the radio channels under supervision of the mobile stations by a method different from that of the above embodiment shall be explained.

In the mobile communication system of the present embodiment, to simplify the examination, it is assumed that the mobile station 1 lies in the radio zone 3b and has already established a communication path with the base station 2b.

In the mobile communication system according to the present embodiment, when sending data from the base station 2b to the mobile station 1, at least one slot is preassigned to each frame. During the period of this slot, the mobile station 1 receives signals through the radio channels transmitted from the base stations nears the base station 2b and signals through the radio channels that are transmitted from the base station 2b but the channels are aside from the one which was used to establish a communication path as stated in the assumption. The mobile station 1 measures the quality of the received signals and compares the signal quality of the radio channels. Furthermore, the mobile station 1 performs control to switch to the radio channel having the best signal quality.

Figure 4A:
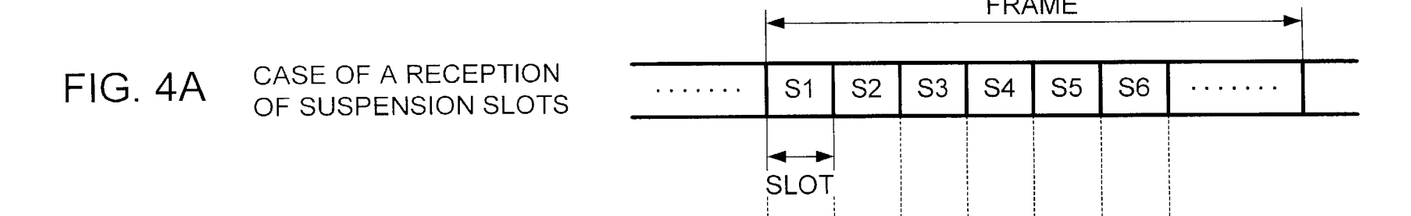
FIGS. 4A–4C are diagrams for respectively explaining the measuring operations for signal quality of a mobile communication system according to another embodiment of the present invention.
Figure 4B:
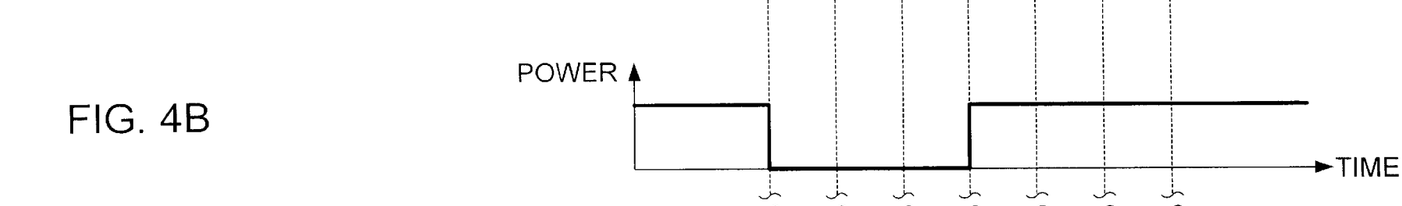

For example, if the radio channels from the base station 2b to the mobile station 1 are defined as shown in FIG. 4A, then S1–S3 are assigned as vacant slots as shown in FIG. 4B.

Figure 4C:
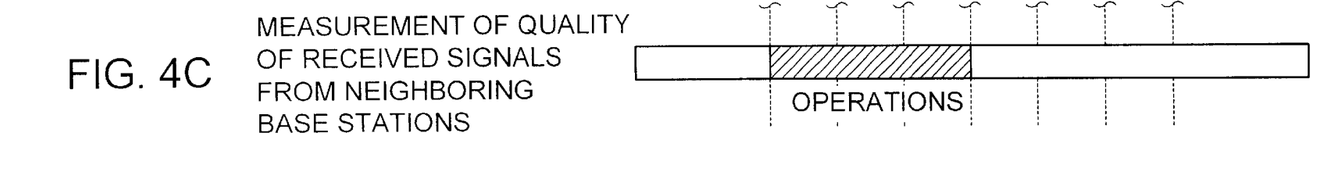

During the periods of these slots S1–S3, the mobile station 1 receives signals on radio channels that are apart from the radio channel currently being used as shown in FIG. 4C, and measures the signal quality thereof.

According to this type of mobile communication system, the mobile station receives signals on radio channels that are apart from the radio channels currently being used in the periods of slots, which have been predesignated as being vacant. Their signal quality can be measured, with no requirement to provide a quality measuring receiver in addition to the communication receiver in the mobile station. As a result, only one receiver system is necessary as shown in FIG. 5. Hence it is possible to ensure the compactness, lightness and low power consumption of the mobile station, and to largely reduce the load on the base station side because the radio channel switching control can be performed under the supervision of the mobile station.

Furthermore, it is of course possible to perform switching control not only of radio channels that are communicating, but also those that are standing by.

Third Embodiment

1. Principle of the Embodiment

In a CDMA mobile communication system, there is basically a single frequency band for each of a forward link (link from the base station to the mobile station) and a reverse link (link from the mobile station to the base station). Communications are realized by a plurality of mobile stations by assigning different spreading codes with respect to each mobile station. Here, the mobile station must generate both a carrier wave for the forward link and a carrier wave for the reverse link in order to communicate with the base station. While one may conceive of providing separate oscillators for generating these carrier waves, however the two carrier waves are usually generated from the same synthesizer that is generated by a common oscillator, so that the mobile stations can be manufactured economically.

When the quality of the received signals decrease, a search is made on the qualities of the received signals of channels other than the channel being used for receiving user information, and handoff is performed if needed. In order to search the qualities of these received signals, one might conceive of providing a receiver exclusively for the search, but as explained with regard to the first and second embodiments, it is preferable to use a single forward link receiver by time-sharing. That is, the receiver must employ a synchronized replica of the spreading signal to demodulate the received signal. As the receiver is required to receive various radio channels with each assigned with a different spreading code, it should have the capability to generate identical synchronized codes according to each radio channel.

CDMA mobile communication systems basically have a single frequency for each of the forward link and the reverse link. However, it is desirable to use a plurality of frequency bands according to the traffic conditions. For example, assuming a case wherein two frequencies, channel A and channel B, both channels are used in zones having relatively large amounts of traffic. In the case wherein the zone has low traffic, only one of channel A or channel B is used.

When a plurality of frequency bands are used, there may be cases in which channel B is searched while communicating with the local base station over the channel A. In mobile stations provided with only one oscillator in order to reduce the cost, it is not possible to simultaneously communicate on a plurality of channels. For this reason, in such a mobile station, switching must be performed between channels A and B by time sharing in order to perform communications and a search in parallel. As a result, the communications on channel A will be interrupted during the period in which the oscillator is setting up channel B.

In a mobile communication systems using only a single channel, it is again favorable to perform communications and searching by time sharing so that mobile stations can be manufactured economically because simultaneous search and communications cause a large load in a mobile station.

Thus, the third and fourth embodiments described below disclose communication methods capable of preventing loss of information in the case that communications are interrupted for the measurement of signals quality.

2. Configuration of Embodiment

Figure 7:
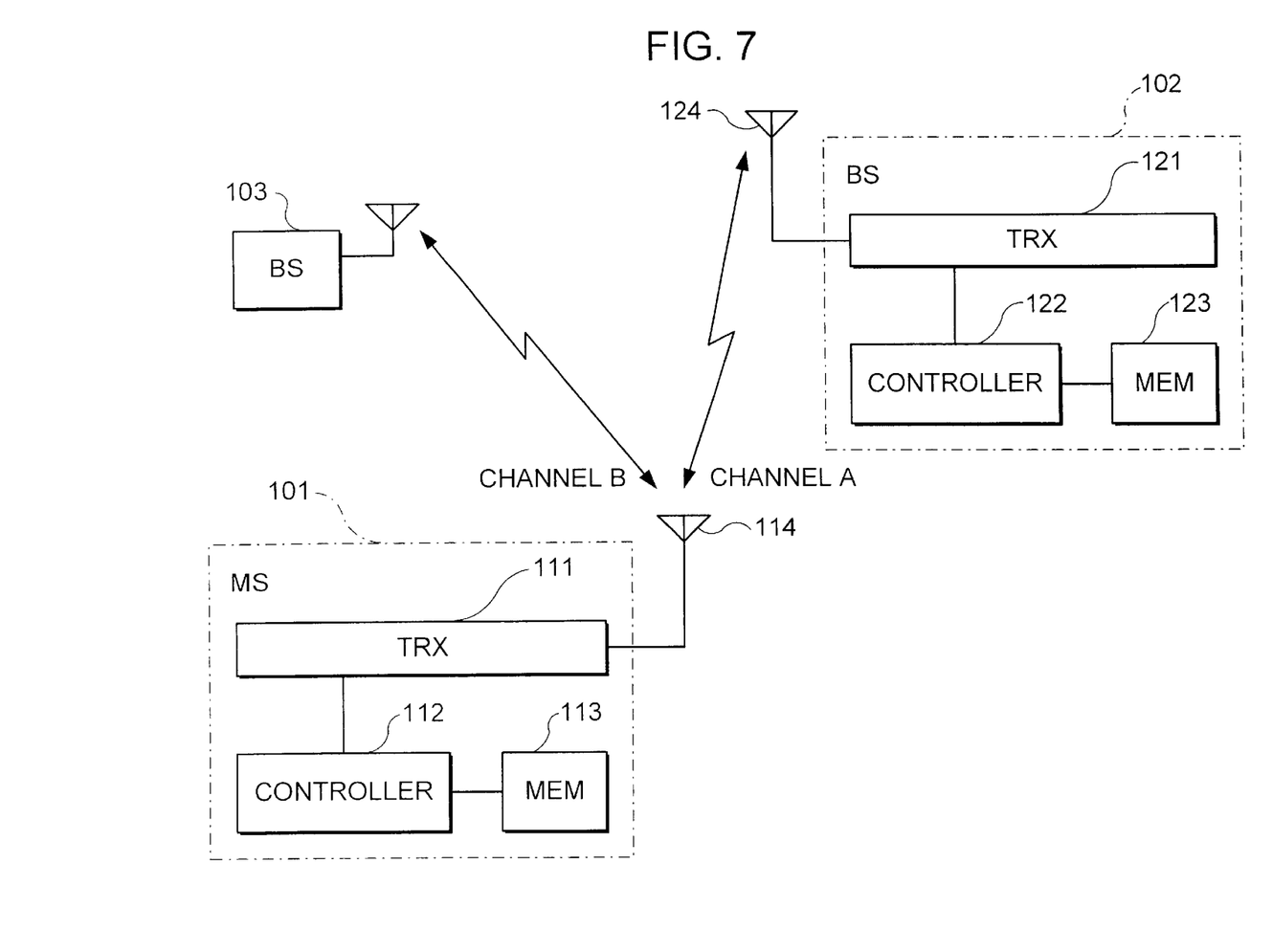
FIG. 7 is a block diagram showing the configuration of a third and fourth embodiment of the present invention.

The configuration of the mobile communication system of the third embodiment of the present invention shall be explained with reference to FIG. 7.

In this drawing, a mobile station 101 includes a transmission device 111. While the transmission device 111 is capable of communicating with the base station on both channels A and B via the antenna 114, communications are possible on only one of the channels at any given moment. A controller 112 controls the transmission device 111. A memory 113 stores a control program to be explained below and various types of data.

A base station 102 includes a transmission device 121. The transmission device 121 communicates with the mobile station 101 on channel A via the antenna 124. A controller controls the transmission device 121. A memory 123 stores a base station control program and various types of data. Another base station 103 has a configuration similar to the base station 102 aside from the fact that it communicates with the mobile station 101 on channel B.

Figures 10A, 10B:
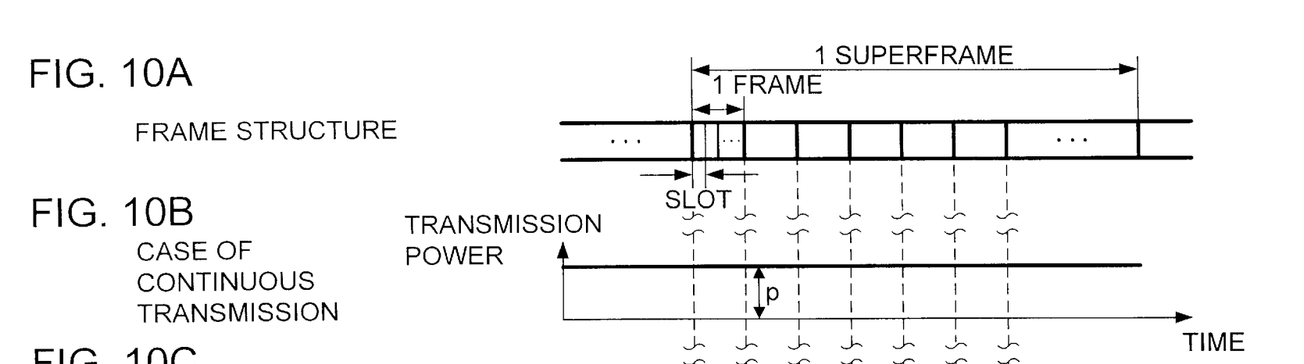
FIGS. 10A–10E are explanatory diagrams for the operations of the third and fourth embodiments.
Figure 10C:
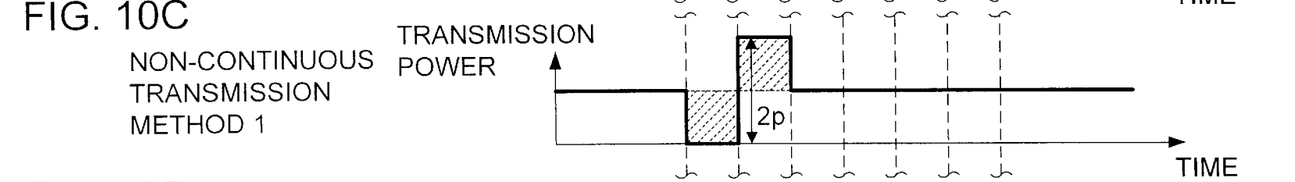

Next, an example of the frame structure in the present embodiment shall be explained with reference to FIG. 10A. In the present embodiment, the mobile station 101 and base stations 102, 103 exchange various signals in units of superframes. A single superframe is composed of 64 frames, and each frame is further composed of a plurality of slots.

3. Operations of Embodiment

Figure 8:
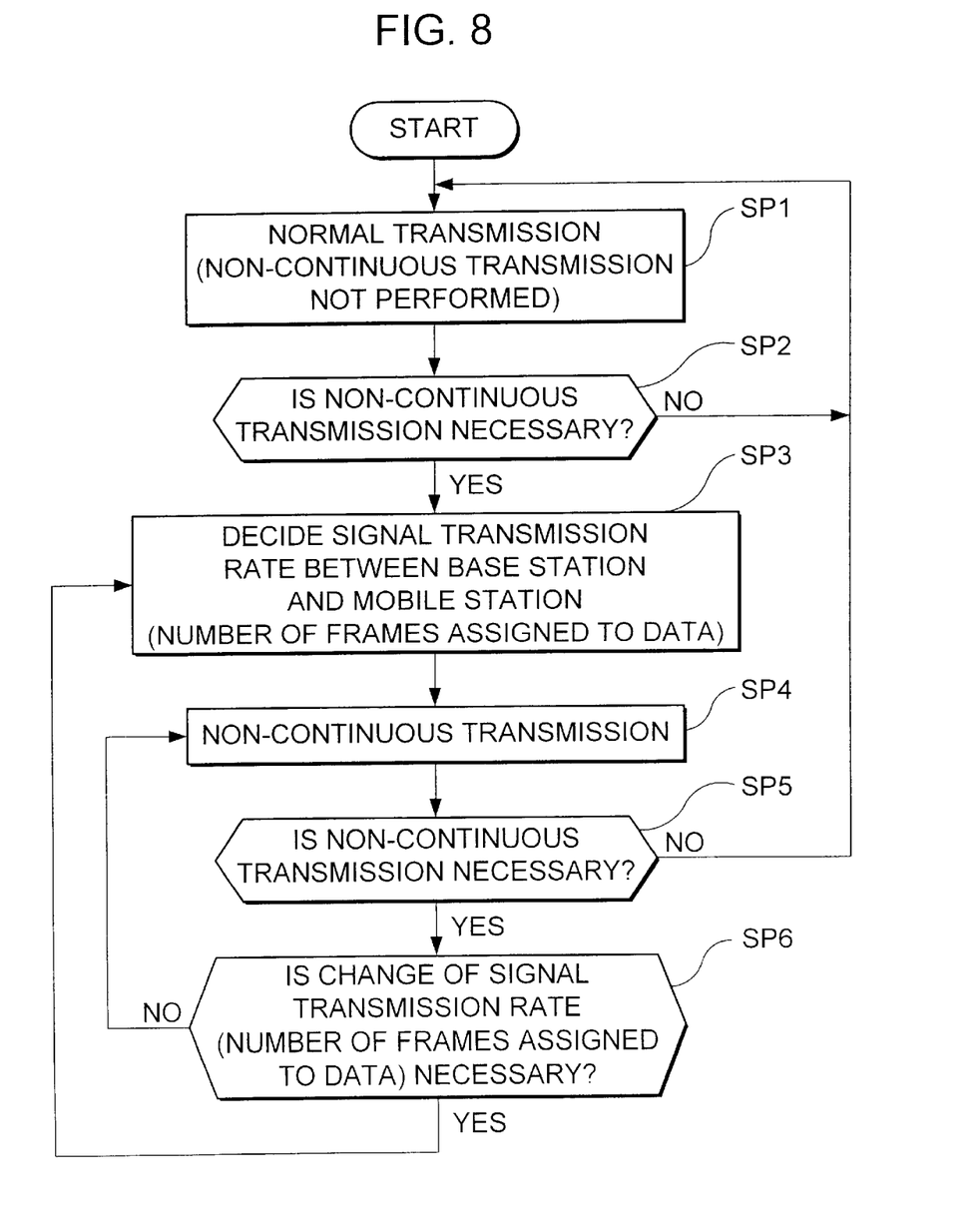
FIG. 8 is a flow chart of the control program for the third embodiment.

Next, the operations of the present embodiment shall be explained. If the mobile station 101 lies in the zone of the base station 102, the program shown in FIG. 8 is activated in the mobile device 101. In this flowchart, when the process advances to step SP1, a command is output from the controller 112 to the transmission device 111 for setting the transmission rate of all frames so as to be the same (as shown in FIG. 10B). Then, normal communications are performed between the mobile station 101 and the base station 102. That is, a unique spreading code is assigned to the mobile station 101, and the mobile station 101 and the base station 102 communicate on channel A. During this communication, the base station 102 may notify the mobile station 101 of channels being used by nearby base stations.

When the procedure advances to step SP2 in the controller 112, it is judged whether there is a necessity to perform a non-continuous transmission in the mobile station 101. That is, it is judged based on the quality of the signals received from the communicating base station with a target value. This procedure is to ensure the quality of the received signals on channels other than the communicating channel must be measured in order to prepare for handoff if the reception quality goes down. As the transmission device 111 can only communicate on a single channel at any given moment, communications will be interrupted during monitoring signal quality of channels other than the radio channel being used for communication.

If the above condition is not fulfilled, the procedure of step SP1 is repeated and normal transmissions are resumed. Then, if the mobile station 101 moves from the base station 102 in the direction of the base station 103 (in FIG. 7), the quality of the signals received from the base station 102 will decrease. Once the above condition is met, a YES results in step SP2 and the procedure advances to step SP3.

Here, a new signal transmission rate capable of compensating for the loss of information due to non-continuous transmission is selected, and the base station 102 is notified of the selected signal transmission rate and affected frames. Then, an acknowledgment signal for the notification is returned from the base station 102 to the mobile station 101.

Here, a specific example of the procedure for deciding the signal transmission rate shall be explained. As one example, the mobile station 101 is capable of handling signal transmission rates of 32, 64, 128, 160, 192 and 256 ksps (symbols per second), and the transmission rate for normal transmission is 128 ksps. Additionally, in FIG. 10A, communications are interrupted to search nearby base stations in the first frame at the head of each superframe. This frame shall henceforth be referred to as an interrupted frame.

In this case, the transmission rate of another frame or plurality of frames (not interrupted) is changed in order to compensate for the data that should have been transmitted in the interrupted frame. That is, a selection is made between "setting the transmission rate of a single frame to 256 ksps to compensate for the single interrupted frame", "setting the transmission rate of two frames to 192 ksps to compensate for the single interrupted frame" or "setting the transmission rate of four frames to 160 ksps to compensate for the single interrupted frame". The contents of the interrupted frame are added to the frames, wherein transmission rates have been changed to compensate for the loss of information. Herebelow, the frames in which the transmission rate has been changed shall be referred to as changed frames.

Describing this selection more generally, the amount of information lost due to the non-continuous transmission when the normal transmission rate is taken as R1 is "(the number of interrupted frames)×(the frame period)×R1". If the transmission rate of the changed frames is taken as R2, the number of changed frames and transmission rate R2 should be decided so that "(the number of changed frames)×(the frame period)×(R2−R1)" is larger than the amount of information lost.

However, in the present embodiment, the transmission rate is selected so as to make the transmission rate in the changed frames as low as possible (i.e. 160 ksps as indicated in the above various selection).

The reason for this shall be explained with reference to FIGS. 10B–E. FIG. 10B shows a transmission output level for the case of performing non-continuous transmission, wherein if the transmission rate is constant, then the transmission output level capable of maintaining a predetermined level of reliability with respect to this transmission rate will be a constant value p as long as the condition of the transmission path does not change. Next, in FIG. 10C, the transmission output level for the case in which a changed frame with a doubled transmission rate immediately follows the interrupted frame. As a characteristic of CDMA, if the transmission rate is doubled, then in order to retain a constant level of reliability, roughly twice the transmission output level is necessary. Accordingly, in the drawing, the transmission output level at the peak will be "2p".

If an attempt is made to make the transmission device 111 correspond to this type of high peak, the power consumption on that transmission circuit will increase and the possible time to continue communication will become shorter in a mobile station with a battery as the power source. Furthermore, in order to ensure a long communication time under such conditions, the device will become larger and the portability will be reduced.

Figure 10D:
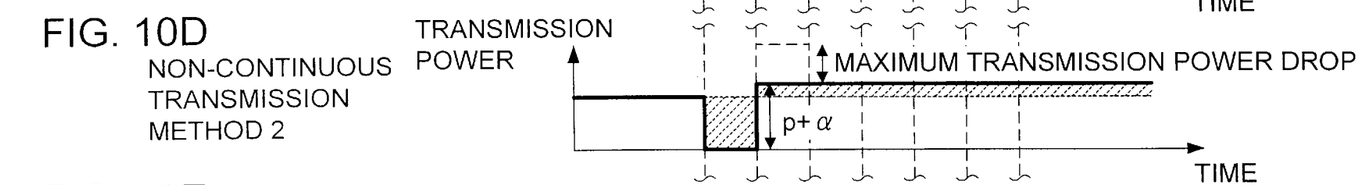

Next, FIG. 10D shows an example wherein all of the frames other than the interrupted frame are made changed frames. In this case, if in one superframe, one frame is interrupted and the transmission rate is compensated using the remaining 63 frames, then the increase in the transmission rate in the changed frames will be only 1/63 of the original transmission rate. For example, if the original transmission rate is 128 ksps, then the increase is 128/63= 2.0317 ksps, thus enabling the increase α in the transmission output level peak to be held to only a slight value. Therefore, it is desirable to set the changed frames as shown in FIG. 10D for the purposes of suppressing the power consumption.

Figure 10E:
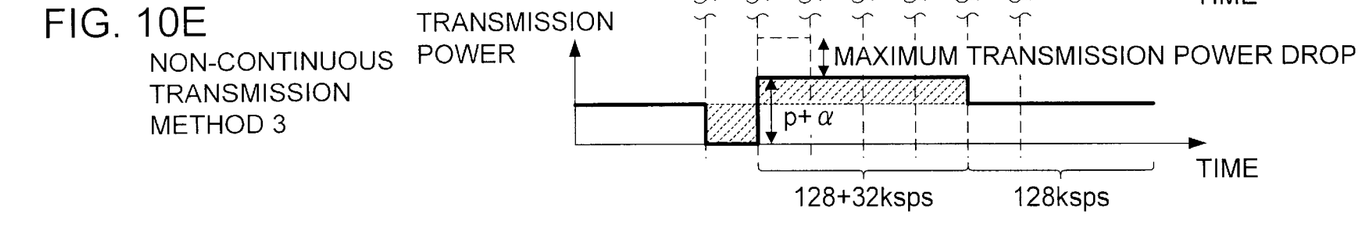

However, in order to simplify the signal transmission procedure, it is assumed that the transmission rate to be used is predetermined. That is, in the present embodiment, the signal transmission rates to be selected are restricted to a limited range, and a transmission rate which minimizes the transmission output level of the peaks within that range is chosen. The transmission output level for the case in which the normal transmission rate is 128 ksps and the transmission rate of the four frames following the interrupted frame is set to 128+128/4=160 ksps is shown in FIG. 10E.

Returning to FIG. 8, when the procedure advances to step SP4, controller 112 will send commands to transmission device 111 concerning the number of interrupted frame to be used for performing the search and the number of the changed frames with the information of the transmission rate and output level. In the transmission device 111, non-continuous transmission through the communication channel and searching of other channels is performed based on the above commands.

Next, when the procedure advances to step SP5, it is judged whether there is a need to continue non-continuous transmissions. For example, a NO decision is made if the reception signal quality from the base station 102 has returned, and the procedure returns to step SP1. As a result, the mobile station 101 notifies the base station 102 to change the transmission rate (terminate non-continuous transmissions and communicate at 128 ksps), an acknowledgement signal is sent from the base station 102 to the mobile station 101, and normal communications are resumed.

On the other hand, if there is a need to continue non-continuous transmissions, then the procedure advances to step SP6. Here, it is judged whether or not a change in the signal transmission rate is necessary. For example, if due to situations such as a sudden decrease in the quality of signals received from the base station 102, the number of interrupted frames for which to search increases, then as a consequence, the transmission rate will have to be set still higher. In this case, a decision of YES is made, and the procedure advances to step SP3. As a result, a new transmission rate is determined between the mobile station 101 and the base station 102. If there is no necessity to change the transmission rate, then the procedure advances to step SP4, and non-continuous transmissions are continued at the prior transmission rate.

Fourth Embodiment

Next, a mobile communication system of the fourth embodiment of the present invention shall be explained.

Figure 9:
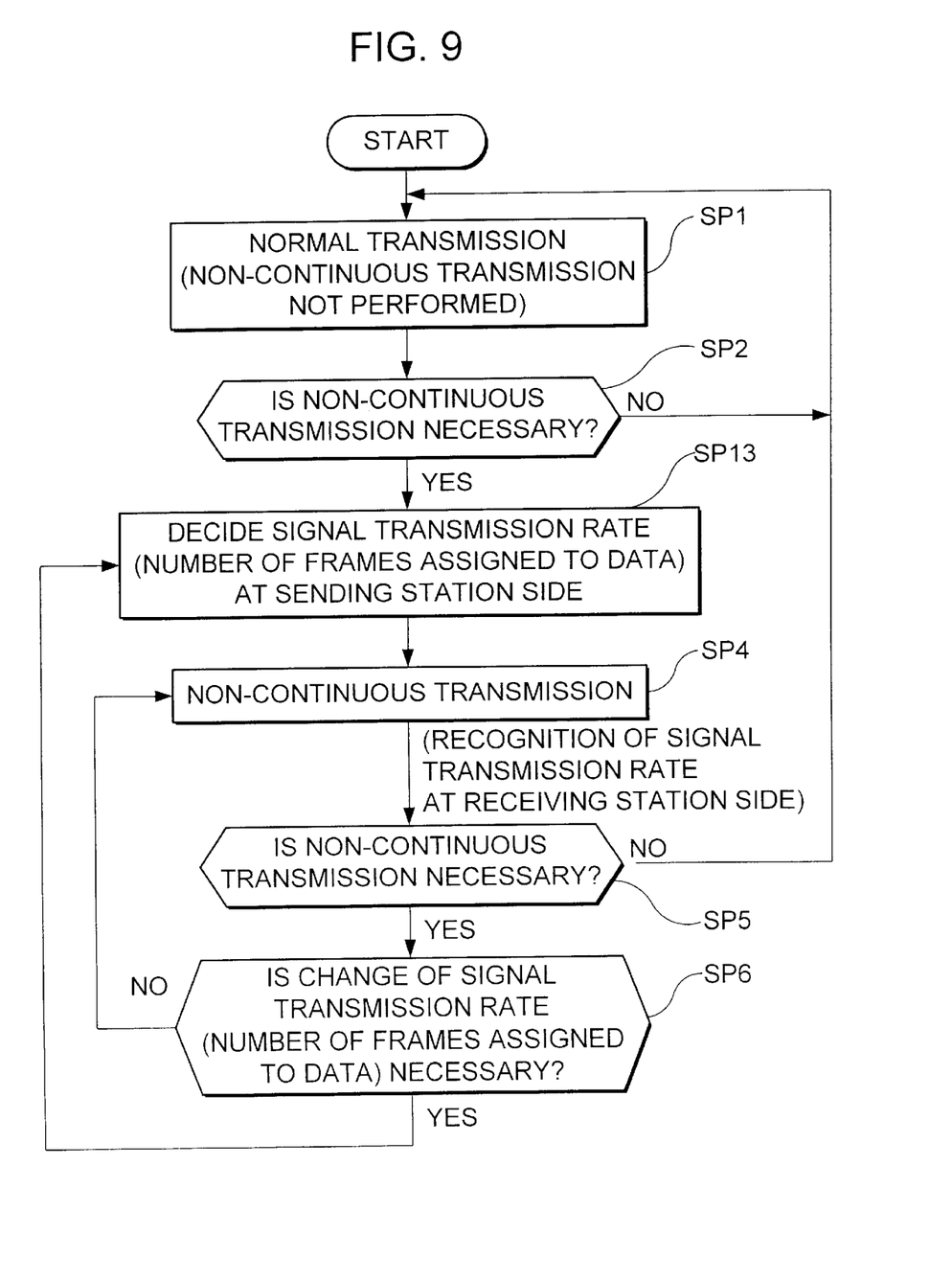
FIG. 9 is a flow chart of the control program for the fourth embodiment.

While the structure of the fourth embodiment is the same as that of the third embodiment, the control program for the mobile station 101 is different in that the content is as shown in FIG. 9. Then, in FIG. 9, step SP13 is performed instead of step SP3 in FIG. 8.

In step SP13, the signal transmission rate of the changed frames during noncontinuous transmission is decided by only the transmission side, i.e. the mobile station 101. When deciding this signal transmission rate, no prior notification is given to the reception side (base station 102). Therefore, when non-continuous transmission is performed in step SP4, the transmission rate is detected on the reception side and communications are performed at the detected transmission rate.

Thus, in the present embodiment, the signal transmission rate is detected on the base station at the receiving side. There is no requirement for any prior exchanges to decide on the signal transmission rate, and the processing load on the mobile station can be reduced.

Modification Example

The present invention is not restricted to the above-described embodiments, and for example, the following modifications are possible.

(1) In the above-described embodiments, voice information is given as an example of user information, but the user information is not restricted thereto, and can be any type of information which can be transmitted. For example, the user information can be packet data.

(2) In the first embodiment, synchronizing information for synchronizing the reception of the user information is given as an example of control information for controlling the mobile station, but the present invention is not restricted thereto, and for example, may be information or data for adaptively increasing or decreasing in the transmission power with respect to the mobile station, or various types of pilot signals. At this time, it is possible to include a plurality of different control information in each slot for transmission.

(3) In the third embodiment, the mobile station notifies the base station of the transmission rate of the changed frames when the signal transmission rate is changed, but it is possible to have the base station notify the mobile station of the transmission rate.

(4) In the fourth embodiment, the base station must detect the signal transmission rate from the mobile station, but it is possible to pre-designate the numbers of the changed frames and the transmission rate of the changed frames when non-continuous transmission begins (e.g. when the mobile station 101 enters the zone of the base station 102), and store them in memory at both ends. In this modification example, the transmission rate of the changed frames is pre-determined in the base station 102, so that a quick and reliable response is possible even if the transmission rate is changed without prior notification.

(5) In the first and second embodiments, it is possible to perform procedures similar to steps SP1 and SP2 of the third and fourth embodiments, so that the mobile station performs intermittent reception only when the quality of the received signals drops.

What is claimed is:

1. A communication method in a communication system having a plurality of first transmission devices and a plurality of second transmission devices, the communication method being performed by each of the second transmission devices and comprising for a particular second transmission device of the plurality of second transmission devices:

communicating with a selected first transmission device of the first transmission devices;

intermittently receiving signals transmitted from the selected first transmission device or intermittently transmitting signals to the selected first transmission device;

a first transmission step of transmitting signals to said selected first transmission device at a transmission rate R1;

a suspension step of suspending signal transmissions to said selected first transmission device;

a second transmission step of transmitting signals to said selected first transmission device at a transmission rate R2 higher than said transmission rate R1; and in said suspension step, monitoring the signal quality of radio channels that are different from the radio channel used by said first and second transmission steps, wherein said transmission rates R1 and R2 have the relationship $R1\ T1 \leq (R2-R1)T2$, where T1 is the duration of said suspension step and T2 is the duration of said second transmission step.

2. A communication method in accordance with claim 1, wherein the duration T2 of said second transmission step is set to an integer multiple of at least twice the duration T1 of said suspension step.

3. A communication method in accordance with claim 1, wherein prior to said suspension step, notification of said transmission rate R2 is given from either said selected first transmission device or said particular second transmission device.

4. A communication method in accordance with claim 1, wherein said particular second transmission device and said selected first transmission device transmit information in units of frames and each of said frames are numbered;

prior to said first transmission step, said transmission rate R2 and the numbers of frames in which said second transmission step is to be performed are stored in the memory of said selected first and particular second transmission devices; and signals are transmitted at a transmission output level P1 in said first transmission step, and signals are transmitted at a transmission output level P2 which is higher than said transmission output level P1 in said second transmission step.

5. A communication device in a communication system comprising:

a plurality of first transmission devices; and a plurality of second transmission devices, wherein a particular second transmission device of the second transmission devices is configured to communicate with a selected first transmission device of the first transmission devices, intermittently receive signals transmitted from the selected first transmission device or intermittently transmit signals to the selected first transmission device, and transmit signals to the selected first transmission device at a first transmission rate R1, suspend signal transmissions to the selected first transmission device, transmit signals to the selected first transmission device at a second transmission rate R2 higher than the first transmission rate, and, while suspending signal transmissions to the selected first transmission device, monitor a signal quality of radio channels that are different from a radio channel used to transmit at the first transmission rate and a radio channel used to transmit at the second transmission rate, and the transmission rates R1 and R2 obey the relationship $R1 \cdot T1 \leq (R2-R1)T2$, where T1 is a duration of suspension of signal transmissions to the selected first transmission device and T2 is a duration of transmission of the signals at the second transmission rate.

6. A communication device in accordance with claim 5, wherein the duration T2 is an integer multiple of at least twice the duration T1.

7. A communication device in accordance with claim 5, wherein prior to suspending signal transmissions to the selected first transmission device, one of the selected first transmission device and the particular second transmission device is configured to notify the other of the selected first transmission device and the particular second transmission device of the transmission rate R2.

8. A communication device in accordance with claim 5, wherein the particular second transmission device and the selected first transmission device are configured to transmit information in units of numbered frames;

prior to transmitting signals to the selected first transmission device at the first transmission rate, the second transmission rate and the numbers of frames in which transmission at the second transmission rate is to be performed are stored in a memory of the selected first transmission device and a memory of the particular second transmission device; and signals are transmitted at a first transmission output level at the first transmission rate and signals are transmitted at a second transmission output level, which is higher than the first transmission output level, at the second transmission rate.

* * * * *

UNITED STATES PATENT AND TRADEMARK OFFICE
CERTIFICATE OF CORRECTION

PATENT NO.     : 6,556,552 B1
DATED          : April 29, 2003
INVENTOR(S)    : Hisashi Nakagomi et al.

It is certified that error appears in the above-identified patent and that said Letters Patent is hereby corrected as shown below:

<u>Title page,</u>
Item [73], delete "Networks," and substitute -- Network, -- in its place.
Item [30], Foreign Application Priority Data, delete "10-130613" and substitute -- HEI 10-130613 -- in its place.

<u>Column 12,</u>
Line 17, delete "R1 T1" and substitute -- R1•T1 -- in its place.

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,556,552 B1
DATED          : April 29, 2003
INVENTOR(S)    : Hisashi Nakagomi et al.

It is certified that error appears in the above-identified patent and that said Letters Patent is hereby corrected as shown below:

Title page,
Item [73], Assignee, delete "NTT Communications Network, Inc." and substitute
-- NTT Mobile Communications Network, Inc. -- in its place.

Signed and Sealed this

Twelfth Day of October, 2004

JON W. DUDAS
*Acting Director of the United States Patent and Trademark Office*